US012592805B2

(12) United States Patent
Yang et al.

(10) Patent No.: US 12,592,805 B2
(45) Date of Patent: Mar. 31, 2026

(54) COMMUNICATION METHOD AND APPARATUS

(71) Applicant: HUAWEI TECHNOLOGIES CO., LTD., Shenzhen (CN)

(72) Inventors: Mao Yang, Xi'an (CN); Zhongjiang Yan, Xi'an (CN); Yiqing Li, Shenzhen (CN); Yunbo Li, Shenzhen (CN); Jian Yu, Shenzhen (CN); Ming Gan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 357 days.

(21) Appl. No.: 18/350,810

(22) Filed: Jul. 12, 2023

(65) Prior Publication Data

US 2023/0353323 A1 Nov. 2, 2023

Related U.S. Application Data

(63) Continuation of application No. PCT/CN2022/071569, filed on Jan. 12, 2022.

(30) Foreign Application Priority Data

Jan. 13, 2021 (CN) .......................... 202110044832.3

(51) Int. Cl.
  *H04L 1/1607* (2023.01)
  *H04L 1/1867* (2023.01)
  (Continued)

(52) U.S. Cl.
  CPC .......... *H04L 5/0053* (2013.01); *H04L 1/1887* (2013.01)

(58) Field of Classification Search
  CPC ... H04L 5/0053; H04L 1/1887; H04L 47/245; H04L 1/1621
  See application file for complete search history.

(56) References Cited

U.S. PATENT DOCUMENTS

| | | | | |
|---|---|---|---|---|
| 12,250,574 | B2 * | 3/2025 | Hoang | ................. H04W 24/08 |
| 2006/0092871 | A1 | 5/2006 | Nishibayashi et al. | |

(Continued)

FOREIGN PATENT DOCUMENTS

| | | | | |
|---|---|---|---|---|
| CN | 109962863 | A | 7/2019 | |
| CN | 110999467 | * | 4/2020 | ........... H04L 1/1685 |

(Continued)

OTHER PUBLICATIONS

3GPP TSG-RAN2 Meeting#101, R2-1802579 Title:Successfull acknowledgement of RRCConnectionRelease for BL and CE UE (Year: 2018).*

(Continued)

*Primary Examiner* — Faruk Hamza
*Assistant Examiner* — Abusayeed M Haque

(57) ABSTRACT

A communication apparatus and a communication method are disclosed. According to the communication method, a first device sends a block acknowledgment request frame to a second device. The block acknowledgment request frame is used to request the second device to send a block acknowledgment frame indicating a receiving status of an access control layer protocol data unit in first transmission. The first transmission is suspended at a first moment that is earlier than a transmission end moment when the first transmission is not suspended. The first device receives the block acknowledgment frame. The first device starts, at a second moment, to perform second transmission.

17 Claims, 9 Drawing Sheets

(51) Int. Cl.
    *H04L 5/00*         (2006.01)
    *H04L 47/24*      (2022.01)

(56)          References Cited

U.S. PATENT DOCUMENTS

| | | | |
|---|---|---|---|
| 2010/0284393 A1* | 11/2010 | Abraham | H04L 5/005 |
| | | | 370/343 |
| 2011/0286402 A1* | 11/2011 | Gong | H04W 72/543 |
| | | | 375/267 |
| 2017/0055300 A1 | 2/2017 | Pitchaiah | |
| 2017/0270065 A1* | 9/2017 | Ruan | G06F 13/36 |
| 2018/0098352 A1 | 4/2018 | Kim et al. | |
| 2020/0396024 A1* | 12/2020 | Ganesan | H04L 1/1864 |

FOREIGN PATENT DOCUMENTS

| | | | |
|---|---|---|---|
| CN | 110999467 A | 4/2020 | |
| CN | 112218365 * | 1/2021 | H04W 56/005 |

OTHER PUBLICATIONS

P802.11ax/D8.0, Oct. 2020—IEEE Draft Standard for Information technology—Telecommunications and information exchange between systems Local and metropolitan area networks—Specific requirements Part 11: Wireless LAN Medium Access Control (MAC) and Physical Layer (PHY) Specifications Amendment 1: Enhancements for High Efficiency WLAN, Total:820pages.

P802.11-REVmd/D5.0, Sep. 2020—IEEE Approved Draft Standard for Information Technology—Telecommunications and Information Exchange Between Systems Local and Metropolitan Area Networks—Specific Requirements—Part 11: Wireless LAN Medium Access Control (MAC) and Physical Layer (PHY) Specifications, total:4668pages.

Extended European Search Report issued in EP22739035.8, dated Apr. 23, 2024, 8 pages.

* cited by examiner

Moment $t_1$: a suspension moment
of the first transmission

Moment $t_1$: a suspension moment
of the first transmission

1200

COMMUNICATION METHOD AND APPARATUS

CROSS-REFERENCE TO RELATED APPLICATIONS

This application is a continuation of International Application No. PCT/CN2022/071569, filed on Jan. 12, 2022, which claims priority to Chinese Patent Application No. 202110044832.3, filed on Jan. 13, 2021. The disclosures of the aforementioned applications are hereby incorporated by reference in their entireties.

TECHNICAL FIELD

The present disclosure relates to the field of communication technologies, and in particular, to a communication method and apparatus.

BACKGROUND

A carrier sense multiple access with collision avoidance (CSMA/CA) technology is used in IEEE 802.11. For example, in a process in which a station (STA) in an IEEE 802.11 system obtains a channel through contention and successfully performs first transmission, when the first transmission is not completed, and second transmission (the second transmission may be transmission with a higher priority, transmission of a lower-latency service, or the like) is required, the STA may suspend the first transmission and perform the second transmission.

However, after starting to receive the first transmission, a receiving party of the first transmission remains in a receiving status before an original planned end time point of the first transmission, and after a preset duration following the original planned end time point of the first transmission, replies with block acknowledgment (block ACK, BA) to confirm that data in the first transmission is successfully parsed. Consequently, a collision may occur when the receiving party of the first transmission sends the BA and the STA performs the second transmission.

SUMMARY

The present disclosure provides a communication method and apparatus, to define a transmission process in a preemption mechanism, and avoid a collision that may occur when a receiving party of first transmission sends a BA and a STA performs second transmission.

According to a first aspect, the present disclosure provides a communication method. The method may include: A first device sends a block acknowledgment request frame to a second device. The block acknowledgment request frame is used to request the second device to send a block acknowledgment frame. The block acknowledgment frame indicates a receiving status of an access control layer protocol data unit in first transmission. The first transmission is suspended at a first moment, and the first moment is earlier than a transmission end moment when the first transmission is not suspended. The first device starts, at a second moment, to perform second transmission. A transmission priority of the second transmission is higher than a transmission priority of the first transmission. The second moment is later than a transmission end moment of the block acknowledgment frame.

In this embodiment, the block acknowledgment request frame is used to trigger the second device to send the block acknowledgment frame. After the block acknowledgment frame is received, the second transmission starts to be performed. The second moment may be earlier than the transmission end moment when the first transmission is not suspended. Therefore, a collision between transmission of the acknowledgment frame in the first transmission and the second transmission can be avoided.

In a possible design, that a first device sends a block acknowledgment request frame to a second device includes: The first device sends the acknowledgment request frame to the second device at a third moment. The third moment is later than the first moment, and the third moment is earlier than the transmission end moment when the first transmission is not suspended. In the foregoing design, the first device sends the block acknowledgment request frame to the second device after suspending the first transmission. In this way, the second device can send the block acknowledgment frame to the first device in time after the first transmission is suspended.

In a possible design, that a first device sends a block acknowledgment request frame to a second device includes: The first device suspends the first transmission at the first moment. A physical layer protocol data unit in the first transmission carries the block acknowledgment request frame. In the foregoing design, the first device includes the block acknowledgment request frame in the first transmission. In this way, the second device can send the block acknowledgment frame to the first device in time after the first transmission is suspended.

In a possible design, after the first device sends the block acknowledgment request frame, the method further includes: If the first device does not receive the block acknowledgment frame within a preset duration after the block acknowledgment request frame is sent, the first device may re-contend for a channel, or continue to send a physical layer protocol data unit to the second device, or start to perform third transmission. According to the foregoing design, transmission in a preemption mechanism can be improved, so that the first device can continue communication when the first device does not receive the block acknowledgment frame. Optionally, a priority of the third transmission may be higher than the priority of the first transmission, may be lower than the priority of the first transmission, or may be the same as the priority of the first transmission.

In a possible design, if no response frame is configured for the second transmission, an end moment of the second transmission is not later than the transmission end moment when the first transmission is not suspended. Alternatively, if a response frame is configured for the second transmission, a transmission end moment of the response frame in the second transmission is not later than the transmission end moment when the first transmission is not suspended. In the foregoing manner, a probability of a transmission collision can be reduced.

In a possible design, before the first device sends the block acknowledgment request frame to the second device, the first device may further send indication information to the second device. The indication information indicates that there is a possibility of preemptive transmission. In the foregoing design, whether preemptive transmission may occur is indicated. In this way, the second device can detect, when preemptive transmission may occur, whether the first transmission is suspended, and may not detect, when there is no preemptive transmission, whether the first transmission is suspended. This reduces overheads of the second device. In addition, the indication information may indicate the second device to enable a function of receiving a new PPDU after the first transmission is suspended. In this way, the second device can receive the BAR frame after the first transmission is suspended.

In a possible design, the indication information may indicate the second device to receive the new physical layer protocol data unit after the first transmission is suspended. According to the foregoing design, the second device can receive the BAR frame after the first transmission is suspended.

In a possible design, the indication information may be carried in the physical layer protocol data unit in the first transmission. According to the foregoing design, implementability and accuracy of the indication information can be improved.

In a possible design, before the first device sends the block acknowledgment request frame to the second device, the first device may further receive information that is sent by the second device and that is used to indicate that there is a preemption capability. The preemption capability means that there is a capability of detecting whether transmission is suspended, and/or there is a capability of starting, after transmission is suspended, to receive a new PPDU. According to the foregoing design, the first device can perform preemptive transmission when the second device has the preemption capability, so that the collision between the block acknowledgment frame in the first transmission and the second transmission can be avoided.

According to a second aspect, the present disclosure provides a communication method. The method may include: A second device determines that first transmission is suspended. A suspension moment of the first transmission is earlier than a transmission end moment when the first transmission is not suspended. The second device receives a block acknowledgment request frame sent by a first device. The block acknowledgment request frame is used to request the second device to send a block acknowledgment frame. The block acknowledgment frame indicates a receiving status of an access control layer protocol data unit in the first transmission. The second device sends the block acknowledgment frame to the first device.

In this embodiment of the present disclosure, the block acknowledgment request frame is used to trigger the second device to send the block acknowledgment frame. After the block acknowledgment frame is received, the second transmission starts to be performed. This can avoid a collision between the acknowledgment frame in the first transmission and the second transmission.

In a possible design, that the second device receives a block acknowledgment request frame sent by a first device includes: The second device receives, before the first transmission is suspended, the block acknowledgment request frame carried in a physical layer protocol data unit in the first transmission. In the foregoing design, the first device includes the block acknowledgment request frame in the first transmission. In this way, the second device can send the block acknowledgment frame to the first device in time after the first transmission is suspended.

In a possible design, before the second device determines that the first transmission is suspended, the second device may further receive indication information sent by the first device. The indication information indicates that there is a possibility of preemptive transmission. The second device enables a function of receiving a new physical layer protocol data unit after the first transmission is suspended. In the foregoing design, whether preemptive transmission may occur is indicated. In this way, the second device can detect, when preemptive transmission may occur, whether the first transmission is suspended, and may not detect, when there is no preemptive transmission, whether the first transmission is suspended. This reduces overheads of the second device. In addition, the indication information may indicate the second device to enable the function of receiving the new PPDU after the first transmission is suspended. In this way, the second device can receive the BAR frame after the first transmission is suspended.

In a possible design, the indication information may indicate the second device to receive the new physical layer protocol data unit after the first transmission is suspended. According to the foregoing design, the second device can receive the BAR frame after the first transmission is suspended.

In a possible design, the indication information may be carried in the physical layer protocol data unit in the first transmission. According to the foregoing design, implementability and accuracy of the indication information can be improved.

In a possible design, after the second device receives the block acknowledgment request frame sent by the first device, the second device may further modify a receiving status of a physical layer to an idle state. According to the foregoing design, the second device can receive another PPDU.

In a possible design, after the second device receives the block acknowledgment request frame sent by the first device, the second device may further maintain a receiving status of a physical layer as a busy state. According to the foregoing design, a protocol can be slightly modified.

In a possible design, before the second device determines that the first transmission is suspended, the method further includes: The second device sends, to the first device, information that is used to indicate that there is a preemption capability. The preemption capability means that there is a capability of detecting whether transmission is suspended, and/or there is a capability of starting, after transmission is suspended, to receive a new PPDU. According to the foregoing design, the first device can perform preemptive transmission when the second device has the preemption capability, so that the collision between transmission of the block acknowledgment frame in the first transmission and the second transmission can be avoided.

In a possible design, the second device may receive the second transmission after sending the block acknowledgment frame to the first device. A priority of the second transmission is higher than a priority of the first transmission. According to the foregoing design, the collision between transmission of the acknowledgment frame in the first transmission and the second transmission can be avoided.

According to a third aspect, the present disclosure further provides a communication apparatus. The communication apparatus may be a first device. The communication apparatus has a function of implementing the first device in the first aspect or each possible design example of the first aspect. The function may be implemented by hardware, or may be implemented by hardware executing corresponding software. The hardware or the software includes one or more modules corresponding to the foregoing function.

In a possible design, a structure of the communication apparatus includes a transceiver unit and a processing unit. These units may perform corresponding functions of the first device in the first aspect or each possible design example of the first aspect. For details, refer to the detailed descriptions in the method examples.

According to a fourth aspect, the present disclosure further provides a communication apparatus. The communication apparatus may be a second device. The communication apparatus has a function of implementing the second device in the second aspect or each possible design example of the second aspect. The function may be implemented by hardware, or may be implemented by hardware executing corresponding software. The hardware or the software includes one or more modules corresponding to the foregoing function.

In a possible design, a structure of the communication apparatus includes a transceiver unit and a processing unit. These units may perform corresponding functions of the second device in the second aspect or each possible design example of the second aspect. For details, refer to the detailed descriptions in the method examples.

In a possible design, a structure of the communication apparatus includes a transceiver and a processor, and optionally, further includes a memory. The transceiver is configured to receive and send data, and is configured to communicate and interact with another device in a communication system. The processor is configured to support the communication apparatus in performing a corresponding function of the second device in the second aspect or each possible design example of the second aspect. The memory is coupled to the processor, and stores program instructions and data that are necessary for the communication apparatus.

According to a fifth aspect, an embodiment of the present disclosure provides a communication system. The communication system may include the foregoing first device and the foregoing second device, and may further include another device and the like.

According to a sixth aspect, an embodiment of the present disclosure provides a computer-readable storage medium. The computer-readable storage medium stores program instructions. When the program instructions are run on a computer, the computer is enabled to perform any one of the first aspect and the possible designs of the first aspect or any one of the second aspect and the possible designs of the second aspect in embodiments of the present disclosure. For example, the computer-readable storage medium may be any usable medium that can be accessed by a computer. By way of example and not limitation, the computer-readable storage medium may include a non-transient computer-readable medium, a random access memory (RAM), a read-only memory (ROM), an electrically erasable programmable read-only memory (electrically EPROM, EEPROM), a CD-ROM or another optical disc storage, a magnetic disk storage medium or another magnetic storage device, or any other medium that can be used to carry or store expected program code in a form of an instruction or a data structure and can be accessed by the computer.

According to a seventh aspect, an embodiment of the present disclosure provides a computer program product including computer program code or instructions. When the computer program product runs on a computer, the computer is enabled to implement the method according to any one of the first aspect and the possible designs of the first aspect or the method according to any one of the second aspect and the possible designs of the second aspect.

According to an eighth aspect, the present disclosure further provides a chip. The chip is coupled to a memory, and is configured to read and execute program instructions stored in the memory, to implement the method according to any one of the first aspect and the possible designs of the first aspect or the method according to any one of the second aspect and the possible designs of the second aspect.

For the third aspect to the eighth aspect and technical effects that can be achieved in the third aspect to the eighth aspect, refer to the descriptions of the technical effects that can be achieved in the possible solutions in the first aspect.

DESCRIPTION OF EMBODIMENTS

The following further describes in detail this application with reference to the accompanying drawings.

Embodiments of the present disclosure provide a communication method and apparatus, to define a transmission process in a preemption mechanism, and avoid a collision that may occur when a receiving party of first transmission sends an acknowledgment frame and a sending party performs second transmission. The method and the apparatus in the present disclosure are based on a same technical concept. The method and the apparatus have similar problem resolving principles. Therefore, for implementations of the apparatus and the method, refer to each other.

The following explains and describes some terms in the present disclosure, to help a person skilled in the art have a better understanding.

(1) First transmission, also referred to as ongoing transmission, is transmission that is originally being performed on a channel but needs to be temporarily suspended and interrupted by preemptive transmission.

Second transmission, also referred to as preemptive transmission, is transmission that is temporarily performed immediately after the first transmission is suspended, and is usually used to carry a higher-priority service or a lower-latency service.

Third transmission may be continued transmission immediately performed by a sending party of the original first transmission. It may be understood that services transmitted in the third transmission and the first transmission are the same, or certainly may be different.

(2) In descriptions of the present disclosure, terms such as "first" and "second" are merely used for purposes of distinguishing descriptions, but should not be understood as indicating or implying relative importance, or should not be understood as indicating or implying a sequence.

(3) In embodiments of the present disclosure, "at least one" means one or more, and "a plurality of" means two or more. The term "and/or" describes an association relationship between associated objects, and indicates that three relationships may exist. For example, A and/or B may indicate one of the following cases: Only A exists, both A and B exist, and only B exists, where A and B may be singular or plural. The character "/" generally indicates an "or" relationship between associated objects. "At least one of the following pieces (items)" or a similar expression thereof indicates any combination of these items, including a single item (piece) or any combination of a plurality of items (pieces). For example, at least one of a, b, or c may indicate a, b, c, a and b, a and c, b and c, or a, b, and c, where a, b, and c may be singular or plural.

To describe the technical solutions in embodiments of the present disclosure more clearly, the following describes the communication method and apparatus provided in embodiments of the present disclosure in detail with reference to the accompanying drawings.

Figure 1:
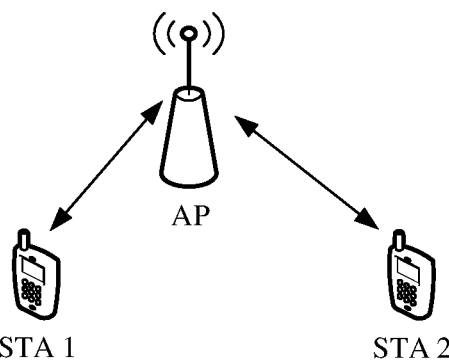
FIG. 1 is a schematic diagram of an architecture of a communication system according to an embodiment of the present disclosure.

FIG. 1 shows a possible architecture of a communication system to which a communication method provided in an embodiment of the present disclosure is applicable. The architecture of the communication system includes at least one access point (AP) (for example, an AP in FIG. 1) and at least one station (STA) (for example, a STA 1 and a STA 2 in FIG. 1). The AP may include but is not limited to a communication server, a router, a switch, a network bridge, and the like. The STA may include but is not limited to a mobile phone, a tablet computer (Pad), a laptop computer, a smartwatch, a smart television, and the like. It should be noted that the STA may be usually an AP, for example, the foregoing router, or a non-access point station (non-AP STA), for example, the foregoing mobile phone.

Figure 2:
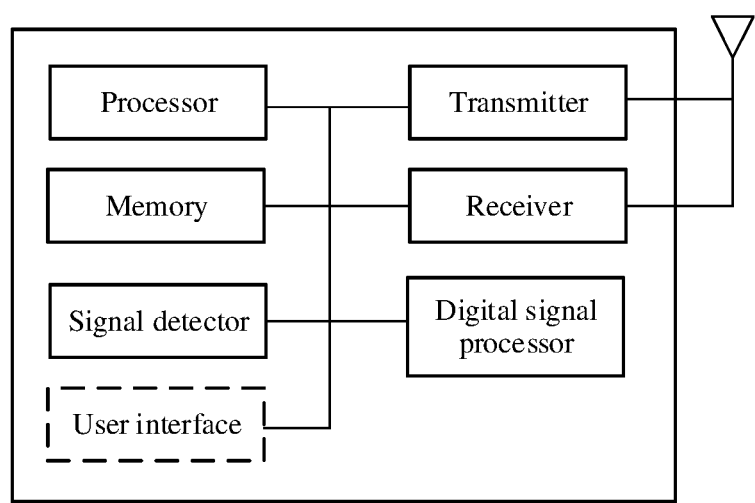
FIG. 2 is a schematic diagram of a structure of an AP or a STA according to an embodiment of the present disclosure.

For example, a specific structure of the AP or the STA may be shown in a structural diagram shown in FIG. 2, and may include a processor, a memory, a transmitter, a receiver, a signal detector, and a digital signal processor, and optionally, may further include a user interface. The transmitter and the receiver may be combined into a transceiver. This is not limited in the present disclosure.

It should be noted that a name of the device shown in FIG. 1 is merely an example, there may be another name in a future communication system, a quantity of the devices in FIG. 1 is also merely an example, and there may be more or fewer devices. This is not limited in the present disclosure.

The communication method provided in the present disclosure is applicable to data communication between an AP and one or more STAs, is applicable to data communication between APs, or is applicable to data communication between STAs. This is not limited in the present disclosure.

The following describes in detail the communication method provided in the present disclosure, to define the transmission process of the preemption mechanism, so that a communication system can efficiently support preemptive transmission. This not only ensures fairness of resource contention between STAs (including an AP and a non-AP STA), but also ensures high efficiency of resource utilization.

Figure 3:
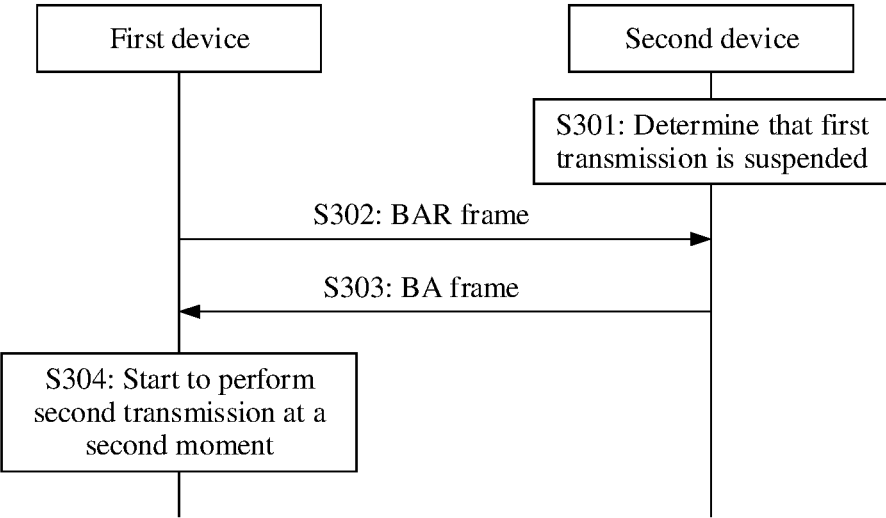
FIG. 3 is a schematic flowchart of a communication method according to an embodiment of the present disclosure.

Based on the foregoing descriptions, a communication method provided in an embodiment of the present disclosure is applicable to the communication system shown in FIG. 1. Refer to FIG. 3. A specific procedure of the method includes the following steps.

S301: A second device determines that first transmission is suspended.

A suspension time point of the first transmission is earlier than a transmission end moment when the first transmission is not suspended.

In an implementation, the second device may determine, by detecting that an interruption duration of the first transmission exceeds preset duration, that the first transmission is suspended.

Alternatively, the second device may determine, in another manner, that the first transmission is suspended. For example, a physical layer protocol data unit (PHY protocol data unit, PPDU) in the first transmission carries information indicating suspension, or the like.

In some embodiments, the second device may detect, in a process of receiving the PPDU in the first transmission, whether the first transmission is suspended. Optionally, after detecting that the first transmission is suspended, the second device may have a capability of starting to receive a new PPDU. In this way, the second device can receive a block acknowledgment request (BAR) frame in time.

S302: A first device sends a BAR frame to the second device. Correspondingly, the second device receives the BAR frame sent by the first device.

The BAR frame is used to request the second device to send a block acknowledgment (BA) frame. The BA frame indicates a receiving status of an access control management protocol data unit (medium access control protocol data unit, MPDU) in the first transmission, for example, a successfully received MPDU or an unsuccessfully received MPDU.

The first device may be the AP or the STA in the communication system shown in FIG. 1.

In an implementation, the first device may suspend the first transmission at a first moment, and send the BAR frame to the second device at a third moment that is later than the first moment. In an optional implementation, an interval between the first moment and the third moment may be interframe space (x inter frame space, xIFS), for example, may be short interframe space (SIFS).

Figure 4:
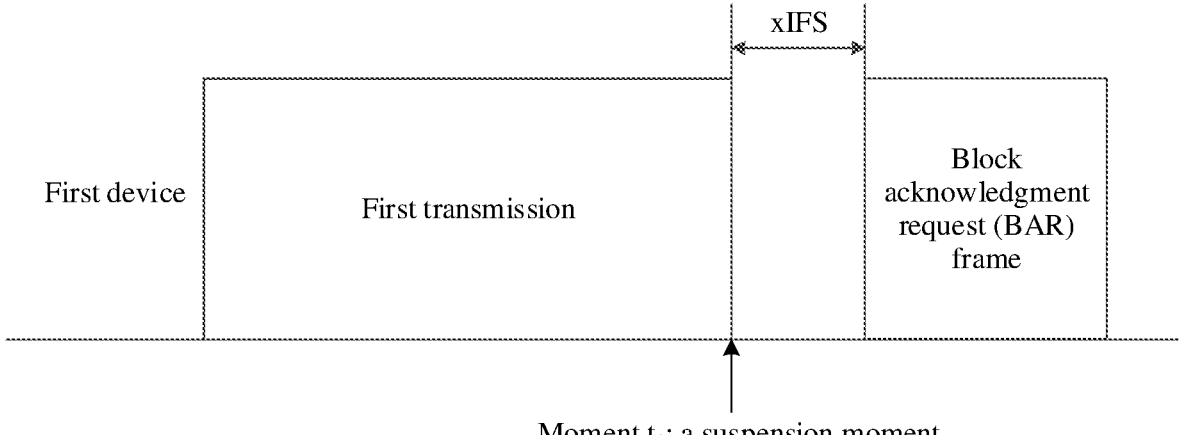
FIG. 4 is a schematic diagram of sending a BAR frame according to an embodiment of the present disclosure.

For example, the first device suspends the first transmission at a moment $t_1$, and sends the BAR frame to the second device at a moment $t_1 + xIFS$, where $0 < xIFS \leq SIFS$, as shown in FIG. 4.

Figure 5:
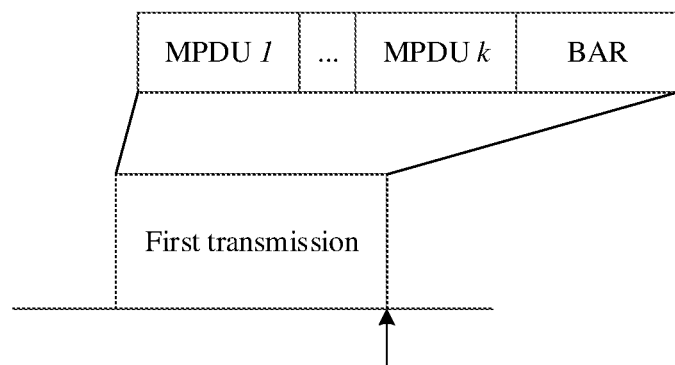
FIG. 5 is another schematic diagram of sending a BAR frame according to an embodiment of the present disclosure.

In another implementation, when suspending the first transmission at the first moment, the first device aggregates the BAR frame into the PPDU in the first transmission. In other words, the PPDU in the first transmission carries the BAR frame. For example, refer to FIG. 5.

In a possible implementation, after receiving the BAR frame, the second device may maintain a configured receiving status of a physical layer. In other words, the receiving status of the physical layer of the second device maintains a busy state. In addition, a time point at which the receiving status of the physical layer ends maintaining the busy state is the transmission end moment when the first transmission is not suspended. In the foregoing manner, a modification to a protocol can be reduced, and overheads of the second device can be reduced.

In another possible implementation, after receiving the BAR frame, the second device may modify the receiving status of the physical layer to an idle state. In the foregoing manner, the second device can receive another PPDU.

Optionally, the first device may ignore an original planned acknowledgment policy (ACK Policy) of the first transmission, and trigger, by sending the BAR frame to the second device, the second device to reply with the BA frame. If the acknowledgment policy is configured for the first transmission, according to the foregoing design, the first device can ignore the configured acknowledgment policy, to avoid a case in which an error occurs due to a collision between the configured acknowledgment policy and a current acknowledgment policy. Optionally, the first device may ignore the original planned acknowledgment policy (ACK Policy) of the first transmission when bits B5 and B6 in an acknowledgment policy subfield (Ack policy subfield) of a quality of service (QoS) QoS control field are not 11, and trigger, by sending the BAR frame to the second device, the second device to reply with the BA frame.

Optionally, after receiving the BAR frame, the second device may also ignore the original planned acknowledgment policy (ACK Policy) of the first transmission, and directly reply with the block acknowledgment (BA) frame. If the acknowledgment policy is configured for the first transmission, according to the foregoing design, the second device can ignore the configured acknowledgment policy, to avoid the case in which the error occurs due to the collision between the configured acknowledgment policy and the current acknowledgment policy.

In an implementation, the second device may reply with the BA frame after a preset duration after receiving the BAR frame. For example, the preset duration may be SIFS.

In another manner, the second device may alternatively reply with the BA frame after a preset duration after detecting that the first transmission is suspended. For example, the preset duration may be SIFS.

S303: The second device sends the BA frame to the first device. Correspondingly, the first device receives the BA frame sent by the second device.

S304: The first device starts to perform second transmission at a second moment.

Figure 6:
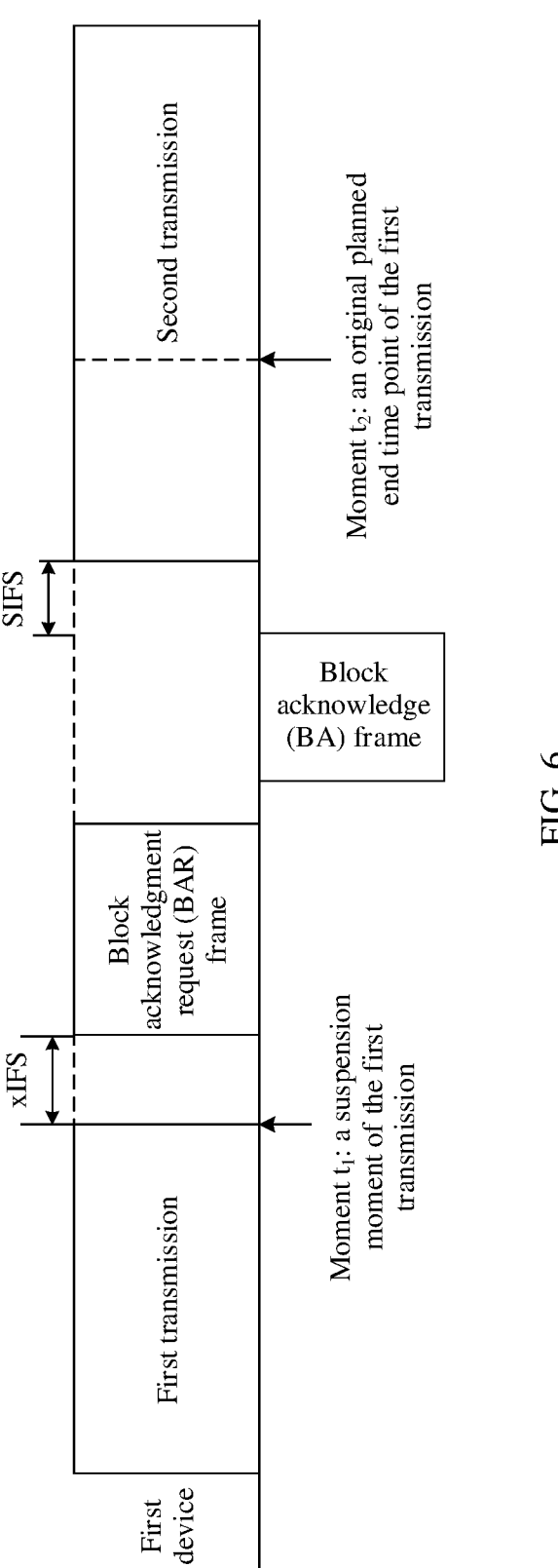
FIG. 6 is a schematic diagram of performing second transmission according to an embodiment of the present disclosure.
Figure 7:
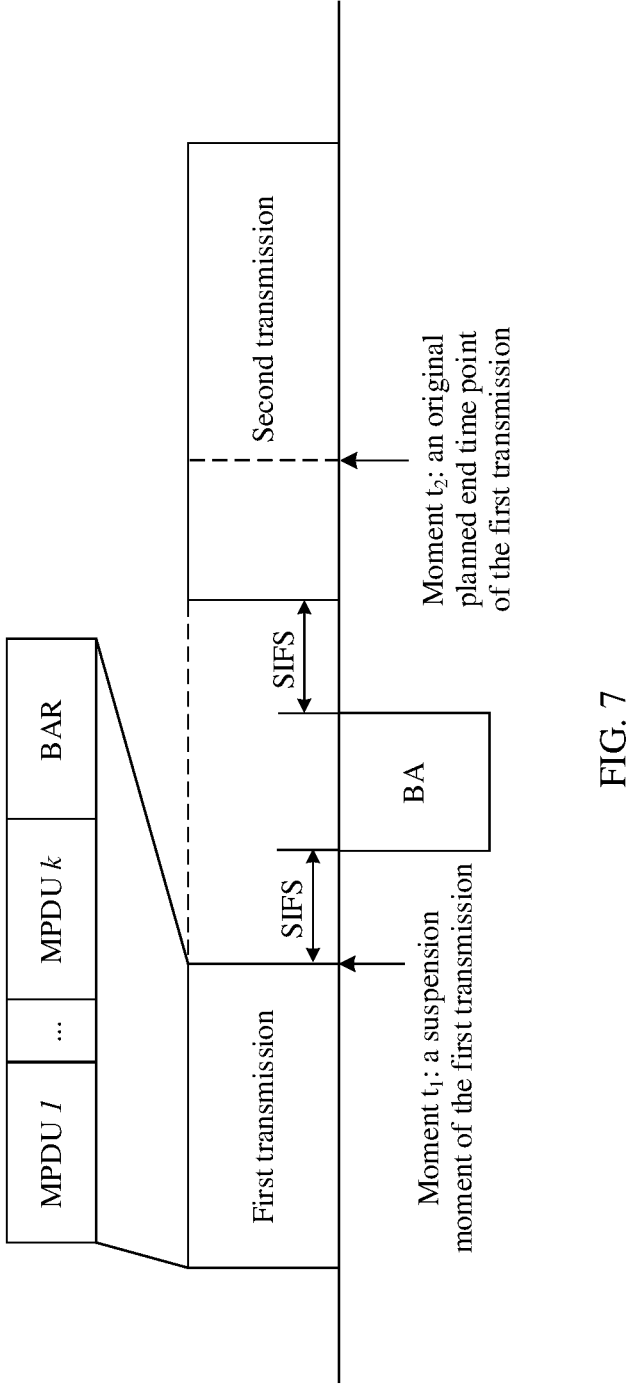
FIG. 7 is another schematic diagram of performing second transmission according to an embodiment of the present disclosure.

A transmission priority of the second transmission is higher than a transmission priority of the first transmission, and the second moment is later than the first moment. For example, the second moment is later than a fourth moment. The fourth moment is a transmission end moment of the block acknowledgment frame. For example, the first device may start, after receiving the BA frame, to perform the second transmission, as shown in FIG. 6 or FIG. 7.

Optionally, a transmission start time point of the second transmission may be earlier than the transmission end moment when the first transmission is not suspended.

In an example description, a duration of the second transmission may not be limited.

In another example description, if no response frame is configured for the second transmission, the end moment of the second transmission may not be later than the transmission end moment when the first transmission is not suspended. Alternatively, if a response frame is configured for the second transmission, a transmission end moment of the response frame in the second transmission may not be later than the transmission end moment when the first transmission is not suspended. In the foregoing manner, a probability of a transmission collision can be reduced.

Optionally, a receiving device of the second transmission may be the second device, or may be another device. This is not specifically limited herein.

In some embodiments, if the first device does not receive the BA frame within a preset duration after the BAR frame is sent, the first device may start, when the preset duration elapses after the BAR frame is sent, to perform third transmission, or the first device may continue to send a physical layer protocol data unit to the second device. Optionally, a priority of the third transmission may be higher than the priority of the first transmission, may be lower than the priority of the first transmission, or may be the same as the priority of the first transmission. For example, the PPDU sent by the first device may be the PPDU in the first transmission, may be a PPDU that is not sent in the first transmission, or may be another PPDU. This is not specifically limited herein.

For example, the preset duration may be ACKTimeOut. For example, the preset duration may satisfy the following formula:

$$T = \text{aSIFSTime} + \text{aSlotTime} + \text{aRxPHYStart} - \text{Delay}$$

T is the preset duration, aSIFSTime may be a length of SIFS, aSlotTime may be a length of a timeslot, aRxPHYStart may be a receiving start time point of the physical layer, and Delay may be a delay.

Optionally, in the foregoing embodiment, the first device may perform clear channel assessment (clear channel access, CCA) before starting to perform the second transmission or continuing to send the physical layer protocol data unit to the second device.

In some other embodiments, if the first device does not receive the BA frame within a preset duration after the BAR frame is sent, the first device may alternatively re-contend for a channel.

Figure 8:
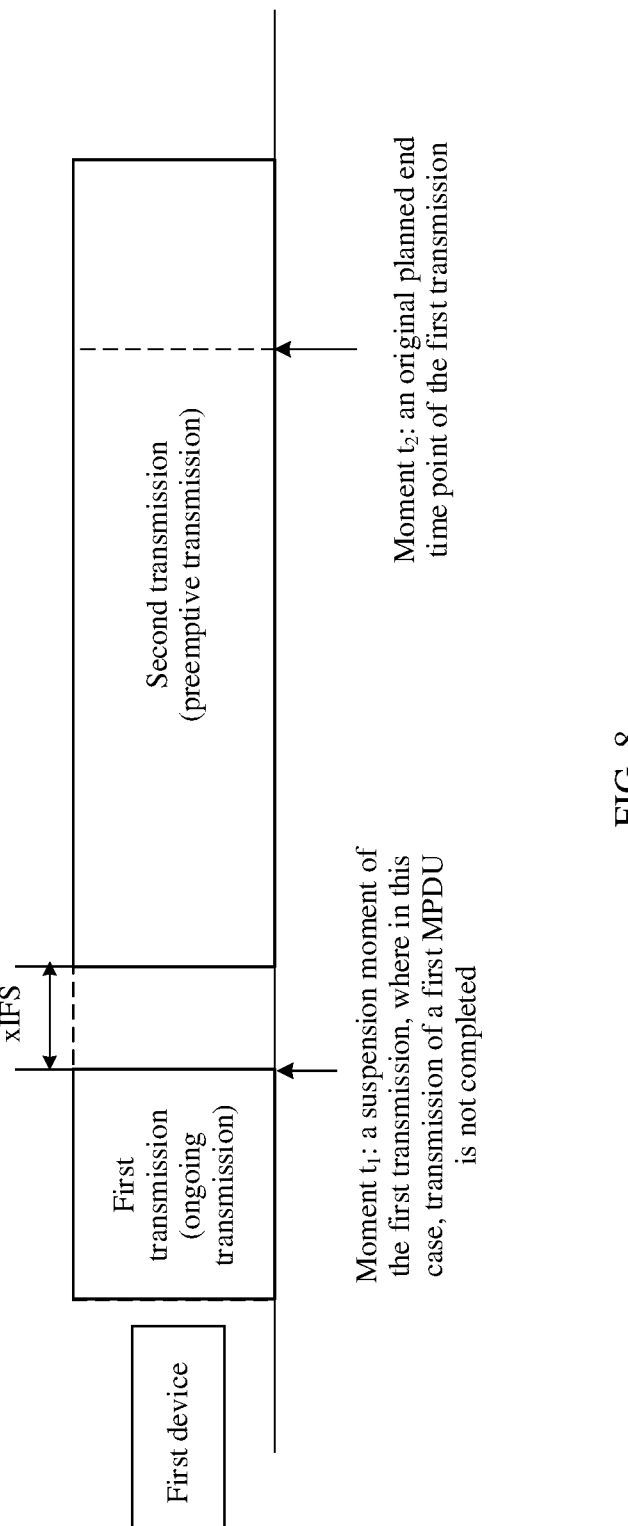
FIG. 8 is another schematic diagram of performing second transmission according to an embodiment of the present disclosure.

Optionally, if transmission of a first MPDU is not completed when the first transmission is suspended at the first moment, the first device may alternatively not send the BAR frame to the second device, and start to perform the second transmission after the first moment, as shown in FIG. 8.

In a possible implementation, before the first device sends an acknowledgment request message to the second device, the first device may send indication information to the second device. The indication information indicates that there is a possibility of preemptive transmission. In an implementation, the indication information may be carried in the physical layer protocol data unit in the first transmission.

Figure 9:
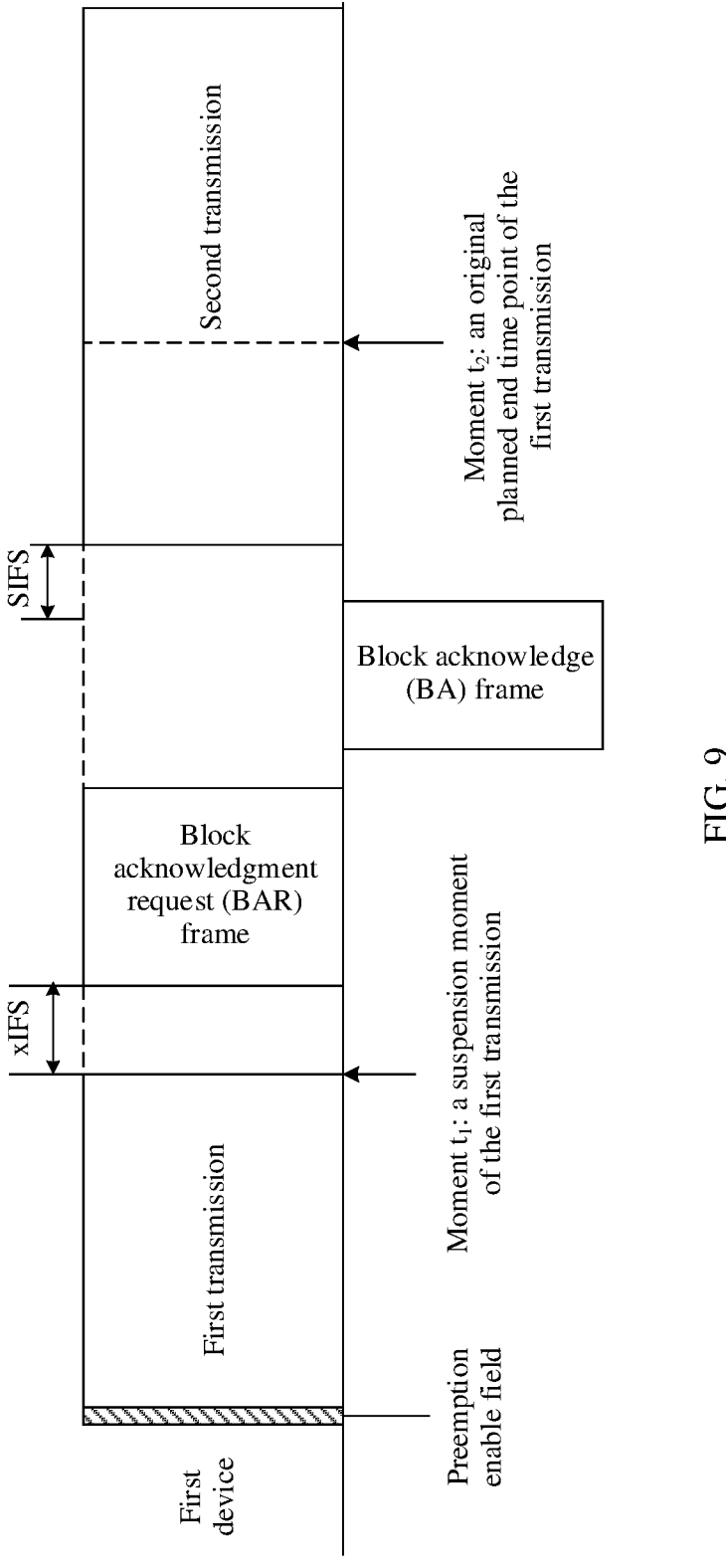
FIG. 9 is a schematic diagram of a preemption enable field according to an embodiment of the present disclosure.

For example, as shown in FIG. 9, the first device may include n-bit indication information in the PPDU in the first transmission, where n is an integer greater than 0. The indication information may be referred to as a preemption enable field. The preemption enable field may indicate, by using two states, whether preemptive transmission may occur. For example, n is equal to 1. If the preemption enable field is 1, it may indicate that an event of suspension and triggering the second transmission may occur in a process of the first transmission. If the preemption enable field is 0, it indicates that no suspension occurs in the process of the first transmission.

After the second device or another device (for example, another STA) receives the PPDU in the first transmission, if the second device or the another device obtains, through parsing, that the preemption enable field in the PPDU is 1, the second device or the another device may detect whether the first transmission is suspended, and after detecting that the first transmission is suspended, the second device or the another device starts to receive the new PPDU.

Figure 10:
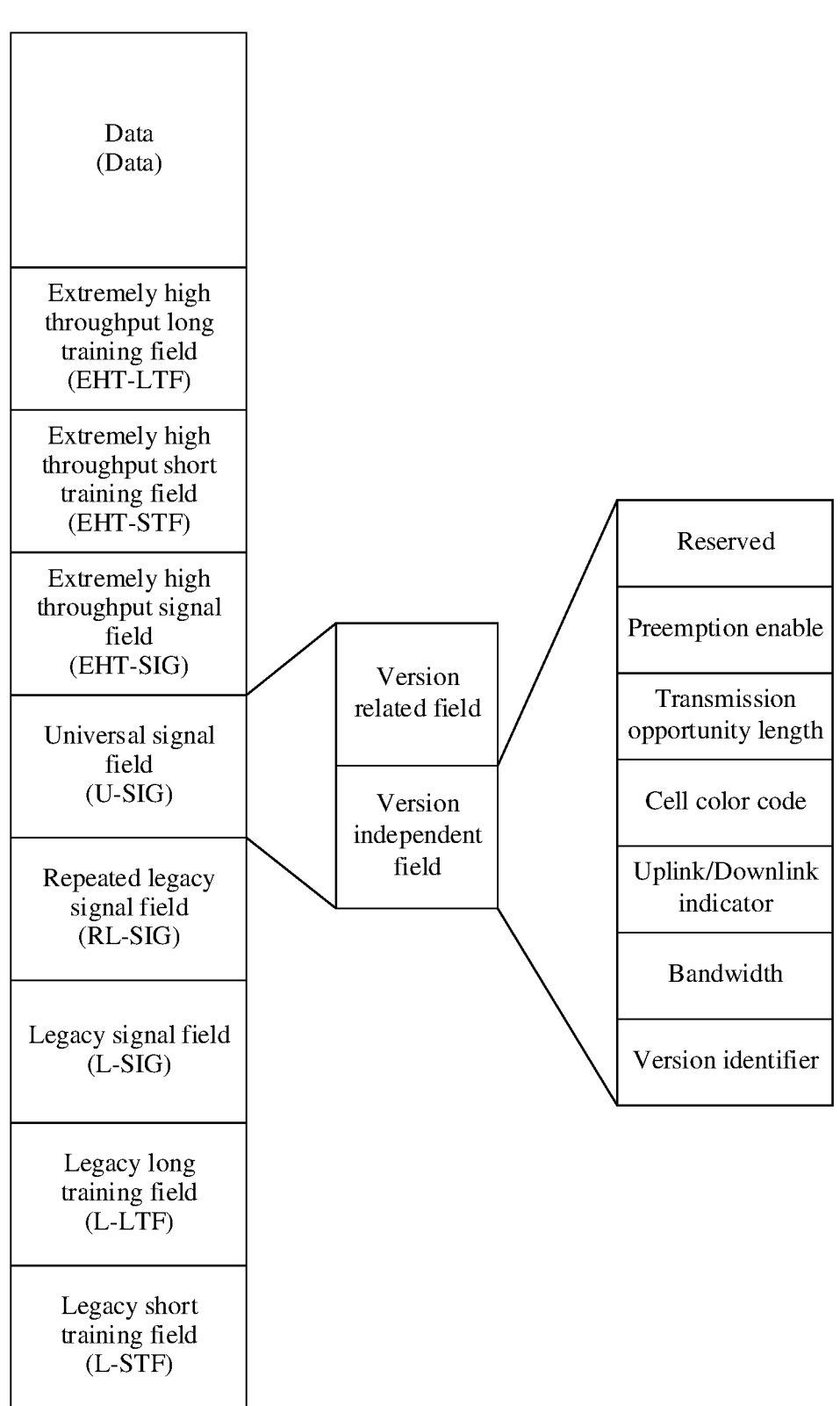
FIG. 10 is a schematic diagram of a preemption enable field according to an embodiment of the present disclosure.
Figure 11:
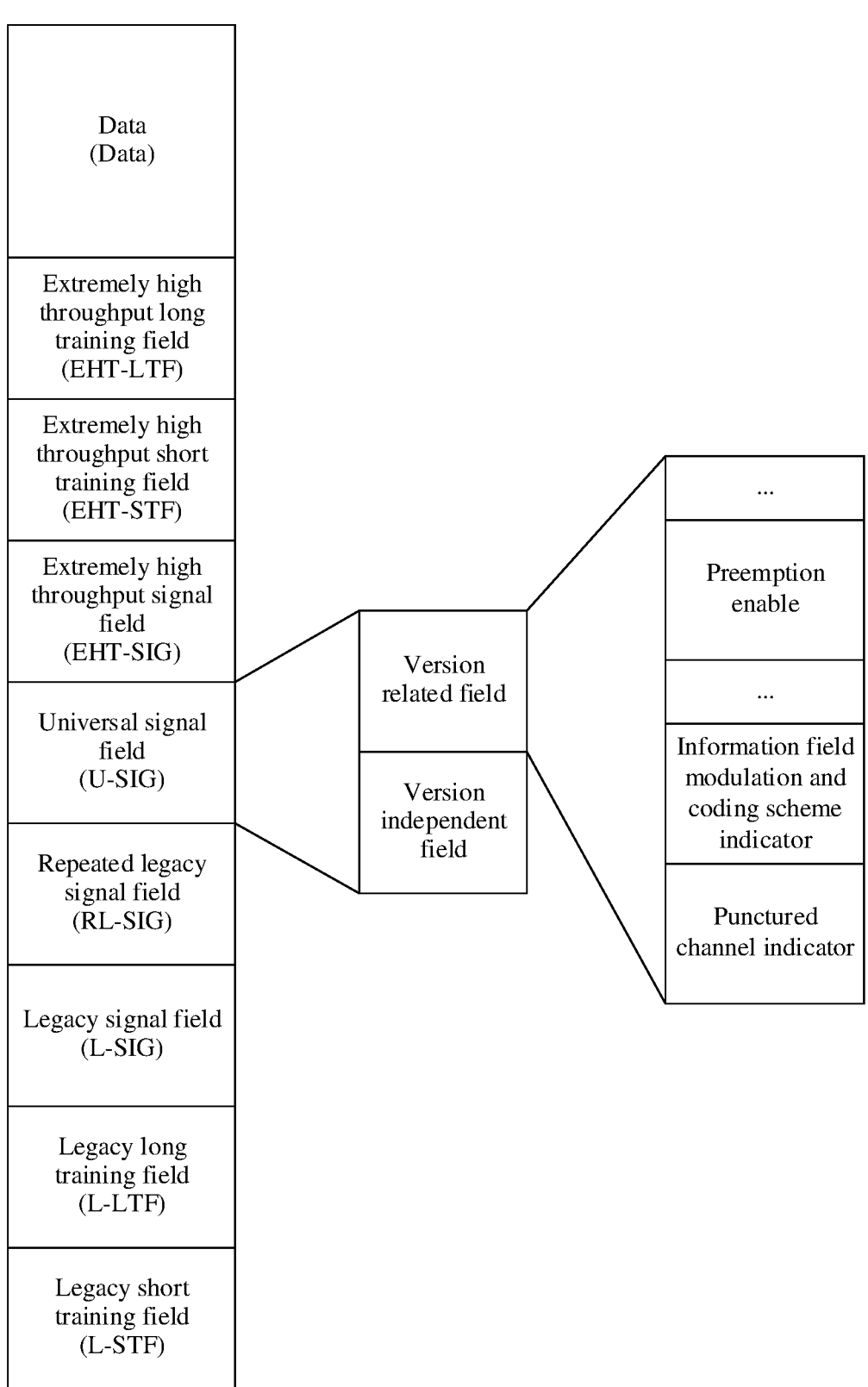
FIG. 11 is a schematic diagram of a preemption enable field according to an embodiment of the present disclosure.

In this embodiment, a specific location of the preemption enable field in the PPDU is not limited. In an example, the preemption enable field is carried in an extremely high throughput (EHT) general signal (universal signal, U-SIG) field. For example, a version independent field of the U-SIG may include the preemption enable field, for example, as shown in FIG. 10. Alternatively, a version related field of the U-SIG may include the preemption enable field, for example, as shown in FIG. 11. It should be understood that FIG. 10 and FIG. 11 are merely schematic diagrams, and do not specifically limit a position of the preemption enable field.

Optionally, the second device may send, to the first device, information that is used to indicate whether the second device has a preemption capability. The preemption capability means that there is a capability of detecting whether transmission is suspended, and/or there is a capability of starting, after transmission is suspended, to receive a new PPDU.

In an implementation, if the second device is a STA, the second device may include an m-bit preemption capability indicator field in an association request frame, where m is an integer greater than 1. Optionally, the association request frame may be an IEEE 802.11 association request frame. For example, m is equal to 1. If the preemption capability indicator field is 1, it may indicate that the second device has the preemption capability. If the preemption capability indicator field is 0, it indicates that the second device does not have the preemption capability.

In this embodiment, a specific location of the preemption capability indicator field in the association request frame is not limited. In an example, the preemption capability indicator field is carried in an extremely high throughput capability element (EHT Capability Element) field.

If the second device is an AP, the second device may include a t-bit preemption capability indicator field in a beacon frame or a probe response frame, where t is an integer greater than 1. Optionally, the beacon frame or the probe response frame may be an IEEE 802.11 beacon frame or probe response frame. For example, t is equal to 1. If the preemption capability indicator field is 1, it may indicate that the second device has the preemption capability. If the preemption capability indicator field is 0, it indicates that the second device does not have the preemption capability.

In this embodiment, a specific location of the preemption capability indicator field in the beacon frame or the probe response frame is not limited. In an example, the preemption capability indicator field may be carried in an extremely high throughput capability element field.

Figure 12:
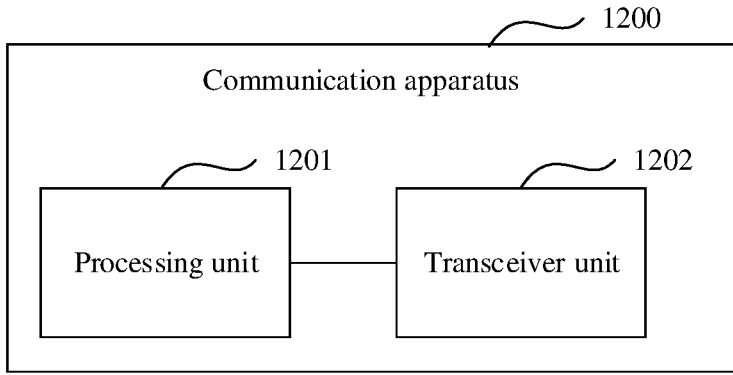
FIG. 12 is a schematic diagram of a structure of a communication apparatus according to an embodiment of the present disclosure.

Based on the foregoing embodiments, an embodiment of the present disclosure further provides a communication apparatus. As shown in FIG. 12, a communication apparatus 1200 may include a processing unit 1201 and a transceiver unit 1202. The transceiver unit 1202 is used by the communication apparatus 1200 to perform communication transmission, for example, receive information (a frame, a message, or data) or send information (a frame, a message, or data). The processing unit 1201 is configured to control and manage an action of the communication apparatus 1200. The processing unit 1201 may further control a step performed by the transceiver unit 1202.

For example, the communication apparatus 1200 may be the first device in the foregoing embodiments, and may be specifically a processor in the first device, a chip, a chip system, or a function module. Specifically, when being configured to implement functions of the first device in the embodiments shown in FIG. 3 to FIG. 11, the communication apparatus 1200 may specifically include: the transceiver unit 1202, configured to receive and send data between the communication apparatus and a second device; and the processing unit 1201, configured to: send a block acknowledgment request frame to the second device by using the transceiver unit 1202, where the block acknowledgment request frame is used to request the second device to send a block acknowledgment frame, the block acknowledgment frame indicates a receiving status of an access control layer protocol data unit in first transmission, the first transmission is suspended at a first moment, and the first moment is earlier than a transmission end moment when the first transmission is not suspended; and start to perform second transmission at a second moment by using the transceiver unit 1202, where a transmission priority of the second transmission is higher than a transmission priority of the first transmission, and the second moment is later than the first moment.

Optionally, the processing unit 1201 is specifically configured to send the block acknowledgment request frame to the second device at a third moment by using the transceiver unit 1202, where the third moment is later than the first moment. Alternatively, the processing unit 1201 is specifically configured to control the transceiver unit 1202 to suspend the first transmission at the first moment, where a physical layer protocol data unit in the first transmission carries the block acknowledgment request frame.

For example, the second moment is later than a fourth moment. The fourth moment is a transmission end moment of the block acknowledgment frame.

Optionally, the processing unit 1201 is further configured to: after the transceiver unit 1202 sends the block acknowledgment request frame, if the transceiver unit 1202 does not receive the block acknowledgment frame within a preset duration after the block acknowledgment request frame is sent, re-contend for a channel, or continue to send a physical layer protocol data unit to the second device by using the transceiver unit 1202, or start to perform the second transmission by using the transceiver unit 1202.

For example, if no response frame is configured for the second transmission, an end moment of the second transmission is not later than the transmission end moment when the first transmission is not suspended. Alternatively, if a response frame is configured for the second transmission, a transmission end moment of the response frame in the second transmission is not later than the transmission end moment when the first transmission is not suspended.

Optionally, the processing unit 1201 is further configured to: before sending the block acknowledgment request frame to the second device by using the transceiver unit 1202, send indication information to the second device by using the transceiver unit 1202, where the indication information indicates that there is a possibility of preemptive transmission.

For example, the indication information may indicate the second device to receive a new physical layer protocol data unit after the first transmission is suspended.

For example, the indication information is carried in the physical layer protocol data unit in the first transmission.

For example, the communication apparatus 1200 may be the second device in the foregoing embodiments, and may be specifically a processor in the second device, a chip, a chip system, or a function module. Specifically, when being configured to implement functions of the second device in the embodiments shown in FIG. 3 to FIG. 11, the communication apparatus 1200 may specifically include: the processing unit 1201, configured to determine that first transmission is suspended, where a suspension moment of the first transmission is earlier than a transmission end moment when the first transmission is not suspended; and the transceiver unit 1202, configured to: receive a block acknowledgment request frame sent by a first device, where the block acknowledgment request frame is used to request the second device to send a block acknowledgment frame, and the block acknowledgment frame indicates a receiving status of an access control layer protocol data unit in the first transmission; and send the block acknowledgment frame to the first device.

Optionally, when receiving the block acknowledgment request frame sent by the first device, the transceiver unit 1202 is specifically configured to: before the first transmission is suspended, receive the block acknowledgment request frame carried in a physical layer protocol data unit in the first transmission.

Optionally, the transceiver unit 1202 is further configured to: before the processing unit 1201 determines that the first transmission is suspended, receive indication information sent by the first device, where the indication information indicates that there is a possibility of preemptive transmission. The processing unit 1201 is further configured to enable a function of receiving a new physical layer protocol data unit after the first transmission is suspended.

For example, the indication information may indicate the second device to receive the new physical layer protocol data unit after the first transmission is suspended.

For example, the indication information is carried in the physical layer protocol data unit in the first transmission.

Optionally, the processing unit 1201 is further configured to: after the transceiver unit 1202 receives the block acknowledgment request frame sent by the first device, modify a receiving status of a physical layer to an idle state, or maintain a receiving status of a physical layer as a busy state.

It should be noted that, in embodiments of the present disclosure, division into the units is an example, and is merely logical function division. During actual implementation, there may be another division manner. Functional units in embodiments of the present disclosure may be integrated into one processing unit, or each of the units may exist alone physically, or two or more units may be integrated into one unit. The integrated unit may be implemented in a form of hardware, or may be implemented in a form of a software functional unit.

When being implemented in the form of the software functional unit and sold or used as an independent product, the integrated unit may be stored in a computer-readable storage medium. Based on such an understanding, the technical solutions of the present disclosure essentially, or the part contributing to the conventional technology, or all or some of the technical solutions may be implemented in a form of a software product. The computer software product is stored in a storage medium, and includes several instructions for instructing a computer device (which may be a personal computer, a server, a network device, or the like) or a processor to perform all or some of the steps of the methods described in embodiments of the present disclosure. The foregoing storage medium includes any medium that can store program code, for example, a USB flash drive, a removable hard disk, a read-only memory (ROM), a random access memory (RAM), a magnetic disk, or an optical disc.

Division into the modules in embodiments of the present disclosure is an example, and is merely logical function division. During specific implementation, there may be another division manner. In addition, function modules in embodiments of the present disclosure may be integrated into one processor, or each of the modules may exist alone physically, or two or more modules are integrated into one module. The integrated module may be implemented in a form of hardware, or may be implemented in a form of a software function module. It may be understood that, for functions or implementations of the modules in embodiments of the present disclosure, further refer to the related descriptions in the method embodiments.

Figure 13:
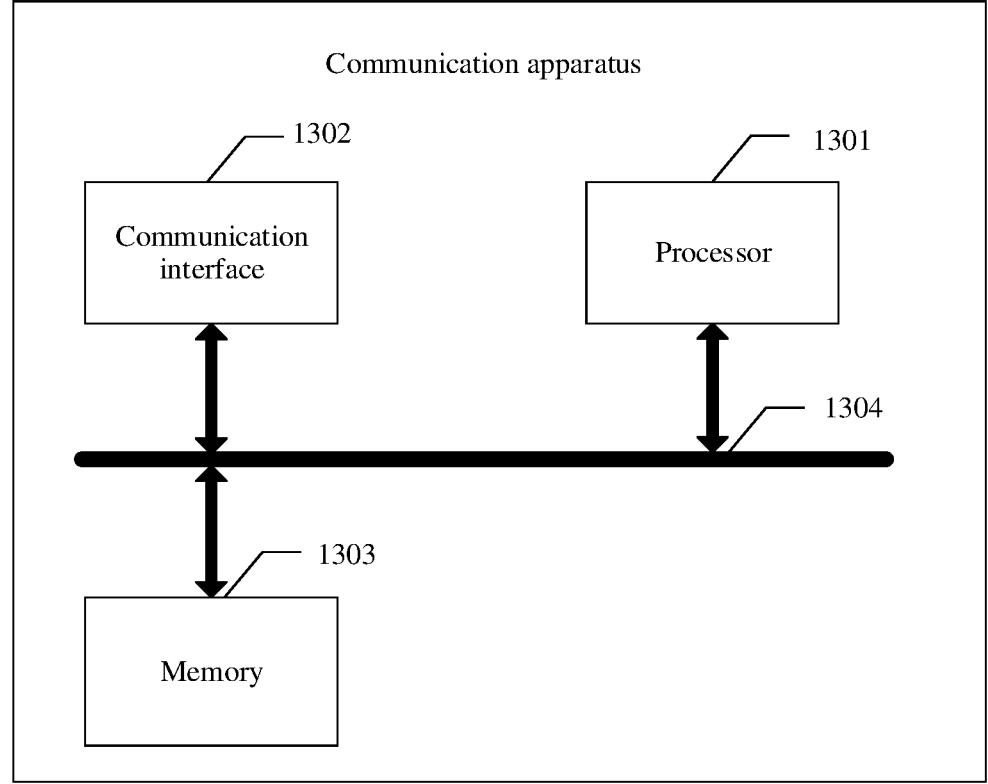
FIG. 13 is a schematic diagram of a structure of a communication apparatus according to an embodiment of the present disclosure.

In a possible manner, the communication apparatus may be shown in FIG. 13. The apparatus may be a communication device or a chip in a communication device. The communication device may be the first device in the foregoing embodiments or the second device in the foregoing embodiments. The apparatus may include a processor 1301, a communication interface 1302, and a memory 1303. The processing unit 1201 may be the processor 1301. The transceiver unit 1202 may be the communication interface 1302.

The processor 1301 may be a CPU, a digital processing unit, or the like. The communication interface 1302 may be a transceiver, an interface circuit, for example, a transceiver circuit, a transceiver chip, or the like. The apparatus further includes the memory 1303, configured to store a program executed by the processor 1301. The memory 1303 may be a non-volatile memory, for example, a hard disk drive (HDD) or a solid-state drive (SSD), or may be a volatile memory, for example, a random access memory (RAM). The memory 1303 is any other medium that can be configured to carry or store expected program code in a form of an instruction or a data structure and that can be accessed by a computer, but is not limited thereto.

The processor 1301 is configured to execute the program code stored in the memory 1303, and is specifically configured to perform an action of the processing unit 1201. The communication interface 1302 is specifically configured to perform an action of the transceiver unit 1202.

A specific connection medium between the communication interface 1302, the processor 1301, and the memory 1303 is not limited in this embodiment. In this embodiment, the memory 1303, the processor 1301, and the communication interface 1302 are connected to each other through a bus 1304 in FIG. 13. The bus is represented by using a thick line in FIG. 13. A connection manner between other components is merely an example for description, and is not limited thereto. The bus may be classified into an address bus, a data bus, a control bus, and the like. For ease of representation, only one thick line is used to represent the bus in FIG. 13, but this does not mean that there is only one bus or only one type of bus.

An embodiment of the present disclosure further provides a communication system, including a communication apparatus configured to implement functions of the first device in the embodiments in FIG. 3 to FIG. 11 and a communication apparatus configured to implement functions of the second device in the embodiments in FIG. 3 to FIG. 11.

An embodiment of the present disclosure further provides a computer-readable storage medium, configured to store computer software instructions that need to be executed by the foregoing processor, and the computer software instructions include a program that needs to be executed by the foregoing processor.

An embodiment of the present disclosure further provides a computer program product. The computer program product is configured to store a computer program. When the computer program is executed by a computer, the computer may implement the communication method provided in the foregoing method embodiments.

An embodiment of the present disclosure further provides a chip. The chip is coupled to a memory, and the chip is configured to implement the communication method provided in the foregoing method embodiments.

A person skilled in the art should understand that embodiments of the present disclosure may be provided as a method, a system, or a computer program product. Therefore, the present disclosure may use a form of a hardware-only embodiment, a software-only embodiment, or an embodiment with a combination of software and hardware. In addition, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the present disclosure. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus configured to implement a specified function in one or more procedures in the flowcharts and/or in one or more blocks in the block diagrams.

These computer program instructions may be alternatively stored in a computer-readable memory that can indicate a computer or another programmable data processing device to work in a specific manner, so that the instructions stored in the computer-readable memory generate an artifact that includes an instruction apparatus. The instruction apparatus implements a specified function in one or more procedures in the flowcharts and/or in one or more blocks in the block diagrams.

These computer program instructions may be alternatively loaded onto a computer or another programmable data processing device, so that a series of operations and steps are performed on the computer or the another programmable device, to generate computer-implemented processing. As a result, the instructions executed on the computer or the another programmable device provide steps for implementing a specified function in one or more procedures in the flowcharts and/or in one or more blocks in the block diagrams.

It is clear that a person skilled in the art can make various modifications and variations to the present disclosure without departing from the spirit and scope of the present disclosure. In this case, the present disclosure is intended to cover these modifications and variations of the present disclosure provided that they fall within the scope of the claims of the present disclosure and equivalent technologies thereof.

What is claimed is:

1. A communication apparatus, comprising:
at least one processor; and one or more memories coupled to the at least one processor and storing instructions that, when executed by the at least one processor, cause the communication apparatus to perform operations comprising:
sending a block acknowledgment request frame to a second device, wherein the block acknowledgment request frame requests the second device to send a block acknowledgment frame, the block acknowledgment frame indicates a receiving status of an access control layer protocol data unit in first transmission, the first transmission is suspended at a first moment, and the first moment is earlier than a transmission end moment when the first transmission is not suspended;
receiving the block acknowledgment frame sent by the second device; and
starting, at a second moment, to perform second transmission, wherein a transmission priority of the second transmission is higher than a transmission priority of the first transmission, and the second moment is later than a transmission end moment of the block acknowledgment frame,
wherein the sending a block acknowledgement request frame to a second device comprises:
sending the block acknowledgement request frame to the second device at a third moment, wherein the third moment is later than the first moment, and the third moment is earlier than the transmission end moment when the first transmission is not suspended.

2. The apparatus according to claim 1, wherein the sending a block acknowledgment request frame to a second device comprises:
suspending the first transmission at the first moment, wherein a physical layer protocol data unit in the first transmission carries the block acknowledgment request frame.

3. The apparatus according to claim 1, wherein after sending the block acknowledgment request frame, the operations further comprise:
when the communication apparatus does not receive the block acknowledgment frame within a preset duration after the block acknowledgment request frame is sent, re-contending for a channel, or continuing to send a physical layer protocol data unit to the second device, or starting to perform third transmission.

4. The apparatus according to claim 1, wherein when no response frame is configured for the second transmission, an end moment of the second transmission is not later than the transmission end moment when the first transmission is not suspended; or
when a response frame is configured for the second transmission, a transmission end moment of the response frame in the second transmission is not later than the transmission end moment when the first transmission is not suspended.

5. The apparatus according to claim 1, wherein before the sending a block acknowledgment request frame to a second device, the operations further comprise:
sending indication information to the second device, wherein the indication information indicates that there is a possibility of preemptive transmission.

6. The apparatus according to claim 5, wherein the indication information indicates the second device to receive a new physical layer protocol data unit after the first transmission is suspended.

7. The apparatus according to claim 5, wherein the indication information is carried in a physical layer protocol data unit in the first transmission.

8. A communication apparatus, comprising:

at least one processor; and one or more memories coupled to the at least one processor and storing instructions that, when executed by the at least one processor, cause the communication apparatus to perform operations comprising:

determining that first transmission is suspended, wherein a suspension moment of the first transmission is earlier than a transmission end moment when the first transmission is not suspended;

receiving a block acknowledgment request frame sent by a first device, wherein the block acknowledgment request frame requests the communication apparatus to send a block acknowledgment frame, and the block acknowledgment frame indicates a receiving status of an access control layer protocol data unit in the first transmission; and sending the block acknowledgment frame to the first device, wherein the receiving a block acknowledgement request frame sent by a first device comprises:

receiving, by the communication apparatus before the first transmission is suspended, the block acknowledgement request frame carried in a physical layer protocol data unit in the first transmission.

9. The apparatus according to claim 8, wherein before the determining that first transmission is suspended, the operations further comprise:

receiving indication information sent by the first device, wherein the indication information indicates that there is a possibility of preemptive transmission; and enabling a function of receiving a new physical layer protocol data unit after the first transmission is suspended.

10. The apparatus according to claim 9, wherein the indication information indicates the communication apparatus to receive the new physical layer protocol data unit after the first transmission is suspended.

11. The apparatus according to claim 9, wherein the indication information is carried in a physical layer protocol data unit in the first transmission.

12. The apparatus according to claim 8, wherein after the receiving a block acknowledgment request frame sent by a first device, the operations further comprise:

modifying a receiving status of a physical layer to an idle state; or maintaining a receiving status of a physical layer as a busy state.

13. A communication method performed by a first device, comprising:

sending a block acknowledgment request frame to a second device, wherein the block acknowledgment request frame requests the second device to send a block acknowledgment frame, the block acknowledgment frame indicates a receiving status of an access control layer protocol data unit in first transmission, the first transmission is suspended at a first moment, and the first moment is earlier than a transmission end moment when the first transmission is not suspended;

receiving the block acknowledgment frame sent by the second device; and starting, by the first device at a second moment, to perform second transmission, wherein a transmission priority of the second transmission is higher than a transmission priority of the first transmission, and the second moment is later than a transmission end moment of the block acknowledgment frame, wherein the sending a block acknowledgement request frame to a second device comprises:

sending the block acknowledgement request frame to the second device at a third moment, wherein the third moment is later than the first moment, and the third moment is earlier than the transmission end moment when the first transmission is not suspended.

14. The method according to claim 13, wherein the sending a block acknowledgment request frame to a second device comprises:

suspending the first transmission at the first moment, wherein a physical layer protocol data unit in the first transmission carries the block acknowledgment request frame.

15. The method according to claim 13, wherein after the first device sends the block acknowledgment request frame, the method further comprises:

when the first device does not receive the block acknowledgment frame within a preset duration after the block acknowledgment request frame is sent, re-contending for a channel, or continuing to send a physical layer protocol data unit to the second device, or starting to perform third transmission.

16. The method according to claim 13, wherein when no response frame is configured for the second transmission, an end moment of the second transmission is not later than the transmission end moment when the first transmission is not suspended; or when a response frame is configured for the second transmission, a transmission end moment of the response frame in the second transmission is not later than the transmission end moment when the first transmission is not suspended.

17. The method according to claim 13, wherein before the sending a block acknowledgment request frame to a second device, the method further comprises:

sending indication information to the second device, wherein the indication information indicates that there is a possibility of preemptive transmission.

* * * * *